DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1363

T889,005

BAKER'S ALL-PURPOSE PLASTIC SHORTENING CONTAINING EMULSIFIERS

David T. Rusch, Claymont, Del., assignor to Atlas Chemical Industries, Inc., Wilmington, Del.

Filed Apr. 24, 1970, Ser. No. 31,727
**Int. Cl. A23d *5/00***
U.S. Cl. 99—92
No Drawing. 22 Pages Specification

An all-purpose plastic shortening composition which contains a mixture of emulsifiers selected from the group consisting of (1) polyoxyethylene ethers of fatty acid esters of sorbitan, sorbitol, and isosorbide or fatty acid esters of polyoxyethylene ethers of sorbitan, sorbitol, and isosorbide (2) fatty acid esters of sorbitan, sorbitol, or isosorbide and optionally (3) a monoglyceride is disclosed. The weight percent of the emulsifier mixture based on the shortening composition is from about 0.6 to about 3%. Of this emulsifier mixture from 0 to 50% is a monoglyceride, from 25 to 80% is emulsifier (1) and from 10 to 50 weight percent is emulsifier (2), wherein the ratio of the polyoxyethylene component (1) to the fatty acid ester component (2) varies from 1 to 1 through 4 to 1. The iodine value of the monoglyceride used in preparing the plastic shortening is always less than 85 and generally greater than 40.

Superior cakes, icings, and cream fillings are prepared with the plastic shortening composition, and all products prepared with said plastic shortening composition exhibit excellent moisture retention and aeration properties.